United States Patent [19]

Mornay et al.

[11] Patent Number: 5,750,916

[45] Date of Patent: May 12, 1998

[54] TRANSMISSION DEVICE HAVING A CENTRAL ROTATING WHEEL AND A LAYING MECHANISM WITH SUCH A DEVICE

[75] Inventors: Emmanuel Mornay, Bourges; Georges Simon, Saint Germain du Puy, both of France

[73] Assignee: CTA International, Versailles, France

[21] Appl. No.: 490,719

[22] Filed: Jun. 15, 1995

[30] Foreign Application Priority Data

Jun. 16, 1994 [FR] France .................................. 94 07354

[51] Int. Cl.[6] ...................................................... F41A 9/02
[52] U.S. Cl. .......................................... 89/33.17; 74/52
[58] Field of Search ............................... 89/33.16, 33.17, 89/33.25, 45; 74/52

[56] References Cited

U.S. PATENT DOCUMENTS 3,750,972  8/1973  Bonnabaud et al. ............... 242/45
5,212,338  5/1993  Maher ................................. 89/45

FOREIGN PATENT DOCUMENTS 0 571 265  11/1993  European Pat. Off. .
601 697   7/1978   Switzerland .
2 206 175  12/1988  United Kingdom .

*Primary Examiner*—Stephen M. Johnson
*Attorney, Agent, or Firm*—Oliff & Berridge

[57] ABSTRACT

A transmission device includes a central wheel, a satellite wheel, a drive element and a tension control device. The central wheel is disposed to rotate about a central wheel axle that is fixed in a first position. The satellite wheel has a satellite wheel axle, which is movable with the satellite wheel relative to the fixed position such that the satellite wheel does not rotate about the satellite wheel axle. The drive element, which has a first portion and a second portion, connects the central wheel and the satellite wheel. When the satellite wheel revolves in a first direction around the central wheel, the central wheel is induced to rotate in a second direction opposite the first direction. The tension control device is connected to the drive element and controls its tension to at least partially compensate for the induced rotation of the central wheel.

20 Claims, 6 Drawing Sheets

TRANSMISSION DEVICE HAVING A CENTRAL ROTATING WHEEL AND A LAYING MECHANISM WITH SUCH A DEVICE

BACKGROUND OF THE INVENTION

The subject of the present invention is a transmission device that includes a central wheel rotating around a first axle which is immobile and a satellite wheel rotating around a second axle which is able to move according to a trajectory given with respect to the first axle and without the satellite wheel rotating around the second axle, the central wheel and the satellite wheel being connected by a drive element forming a closed loop to drive the central wheel and the satellite wheel in reciprocal rotation.

Such a transmission device may be implemented in an ammunition conveyor in which the satellite wheel is a driving pinion linked to the gun shield mantlet and in which the central wheel is a driving pinion controlling the movement of the rounds in the conveyor, the central wheel and the satellite wheel being driven by a chain.

A rotation $\theta_1$ of the gun in elevation, and therefore of the satellite pinion linked to the mantlet, imparts a similar rotation $\theta_2$ of the central pinion which controls the movement of the rounds in the conveyor, because the satellite pinion does not rotate around its own axle during a rotation in elevation of the gun.

SUMMARY OF THE INVENTION

This induced rotation $\theta_2$ interferes with the correct functioning of the gun. Therefore, compensating for or cancelling the induced rotation is desirable.

The basic idea of the invention is at least partially compensating, the induced rotation by a counter-rotation obtained by varying the relative length of the arms of the drive element, for example, a chain, between the central wheel and the satellite wheel.

The transmission device according to the invention includes a controlled tension device on, respectively, a first and a second strand of the drive element which connects the central wheel and the satellite wheel and has a control element acting on the length of the first strand according to the movement of the satellite wheel to compensate at least partially, by counter-rotation, the rotation of the central wheel induced by the said movement of the satellite wheel.

The control device includes a linking element having a first joint element allowing its rotation around a third axle which is immobile and which is parallel to the first axle, a first arm linking the first joint element to the first tension wheel and a second arm linking the first joint element to a pin guided by a cam element having a profile which, by modifying the position of the first tension wheel, allows the length of the first strand to be modified.

The drive element may be a chain or a synchronous belt. The central wheel, the satellite wheel, as well as the first and the second tension wheels may be pinions.

It is advantageous for the first and second tension wheels to be linked by a spring which tends to urge them apart from each other to tighten both the first and the second strands.

The device may therefore include a third arm having a first end disposed to rotate about a third arm axle which is coaxial with a linking element axle to allow the third arm to rotate once around the third axle, independently from the rotation of the linking element, the second tension wheel being mounted on a second end of the third arm.

The cam element is preferably a groove whose profile may be roughly the arc of a circle.

The invention also relates to a laying system for a gun having a transmission device such as that described hereabove and in that the central wheel is a drive wheel controlling the movement of the rounds of the gun and in that the satellite wheel is a driving wheel linked to the elevation laying mantlet of the gun, the trajectory given corresponding to the possible laying of the gun in elevation.

BRIEF DESCRIPTION OF THE DRAWINGS

The invention will be made clearer after reading the description given hereafter by way of a non-exhaustive illustration, with reference to the appended drawings wherein.

DETAILED DESCRIPTION OF PREFERRED EMBODIMENTS

Figure 1A:
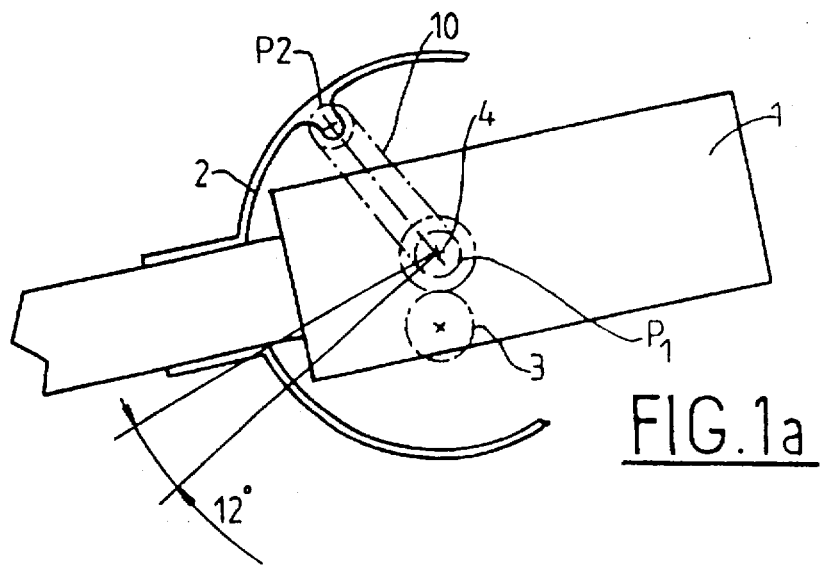
FIG. 1a, FIG. 1b and FIG. 1c illustrate a laying device for a gun in elevation, according to different elevation laying angles.
Figure 1B:
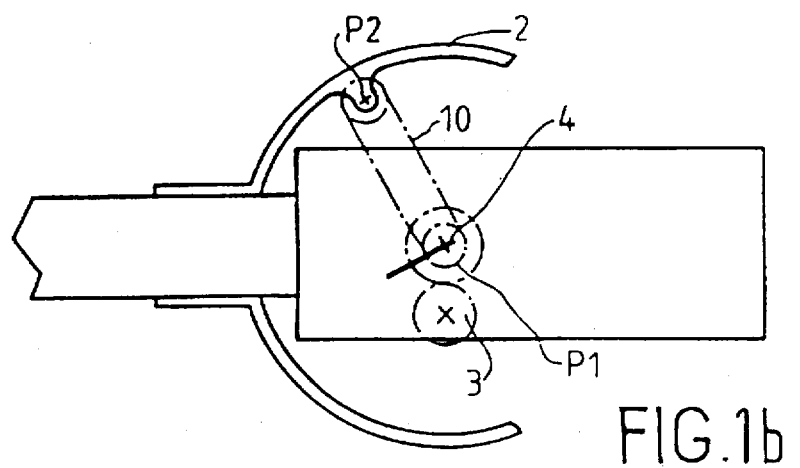
Figure 1C:
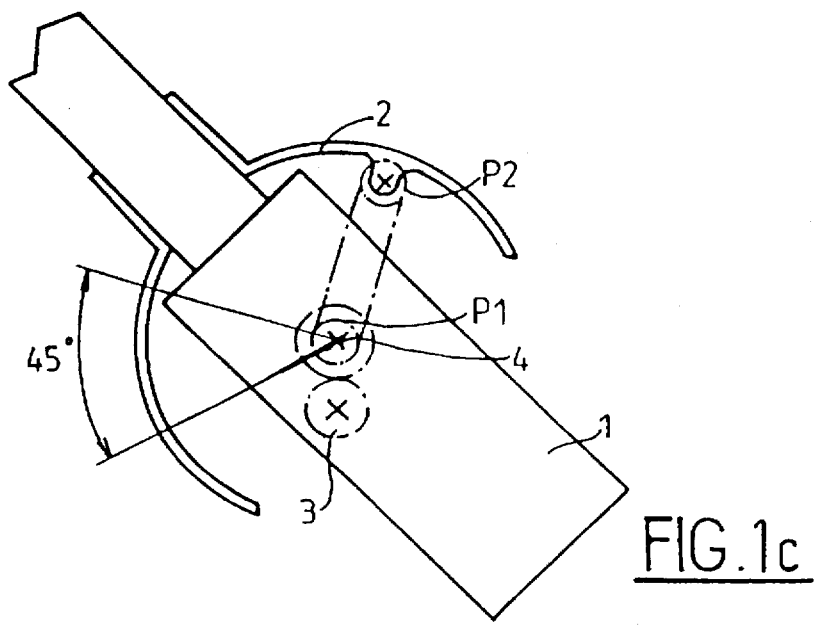

According to FIGS. 1a–1c, a gun 1 having a mantlet 2 may be laid according to different elevation angles, for example −12° in FIG. 1a, 0° in FIG. 1b and +45° in FIG. 1c. The mantlet 2 has a pinion P2, which is the satellite pinion, whose function is to drive an ammunition conveyor. To this end, the drive pinion P2 drives a central pinion P1 whose axle is the rotational axis in elevation of the gun and the pinion P1. The pinion P2 are linked by a closed chain 10. The rotation of the drive pinion P2 drives that of the pinion P1 which, in turn, drives that of a mechanism 3 driving the ammunition conveyor.

A rotation $\theta_1$ of the gun in elevation, and thus of the drive pinion P2 connected to the mantlet, drives a similar rotation $\theta_2$ of the pinion P1 which drives the movement of the ammunition in the conveyor because during the rotation in elevation of the gun 1 the pinion P2 does not rotate around its own axis. In fact, it is only when the gun is fired that the pinion P2 is rotated and drives, in turn, the ammunition conveyor through pinion P1 and the mechanism 3.

This induced rotation $\theta_2$ interferes with the correct functioning of the gun 1 given that the rotation in elevation of the gun 1 causes an undesirable parasitic functioning of the ammunition conveyor.

The problem may be explained as follows (see FIG. 2):

Two toothed pinions P1 and P2 linked by a chain 10, the pinion P1 having a fixed position but being able to rotate around its own axis, the pinion P2 rotating around P1 ($\theta$) but without being able to rotate around its own axis.

Figure 2:
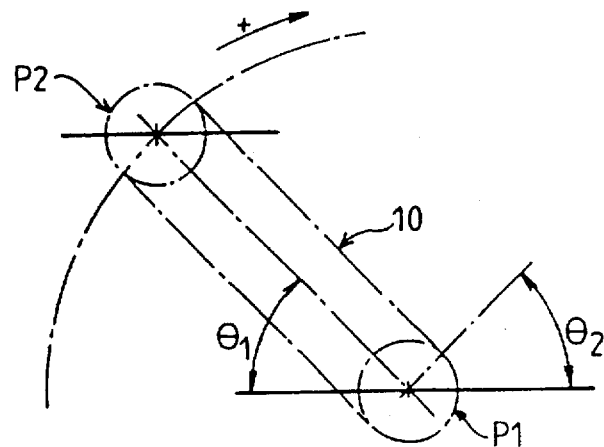
FIG. 2 illustrates the problem posed in the device in FIGS. 1a to 1c.

This rotation $\theta_1$ drives a rotation $\theta_2$ of the pinion around its own axis with $\theta_2 = \theta_2$ in the configuration defined in FIG. 2.

It is thus this angle $\theta_2$ which is most suitable for at least partial compensation or cancellation.

Figure 3A:
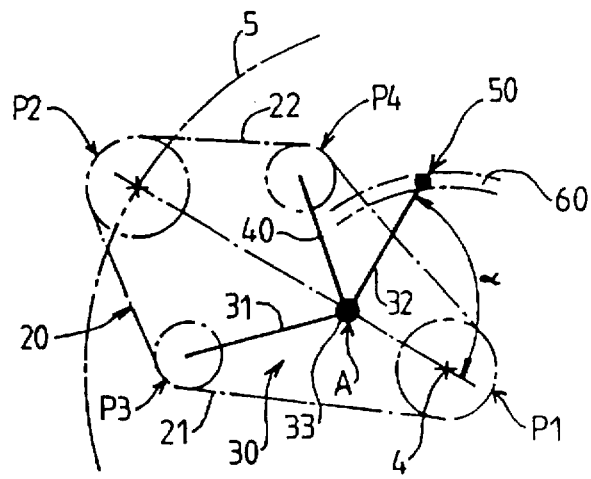
FIG. 3a, FIG. 3b and FIG. 4 illustrate the operation of a device according to a preferred embodiment of the invention.
Figure 3B:
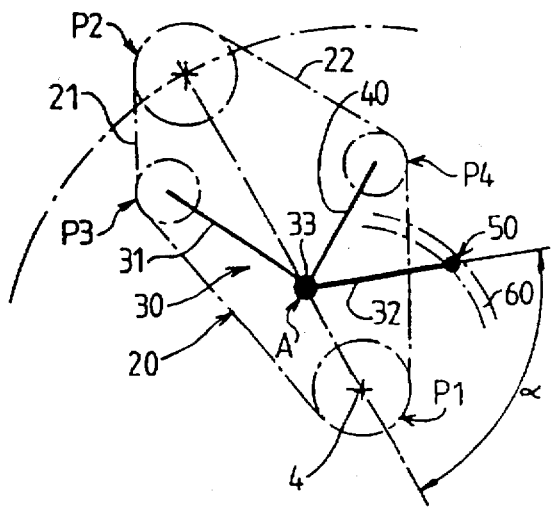
Figure 4:
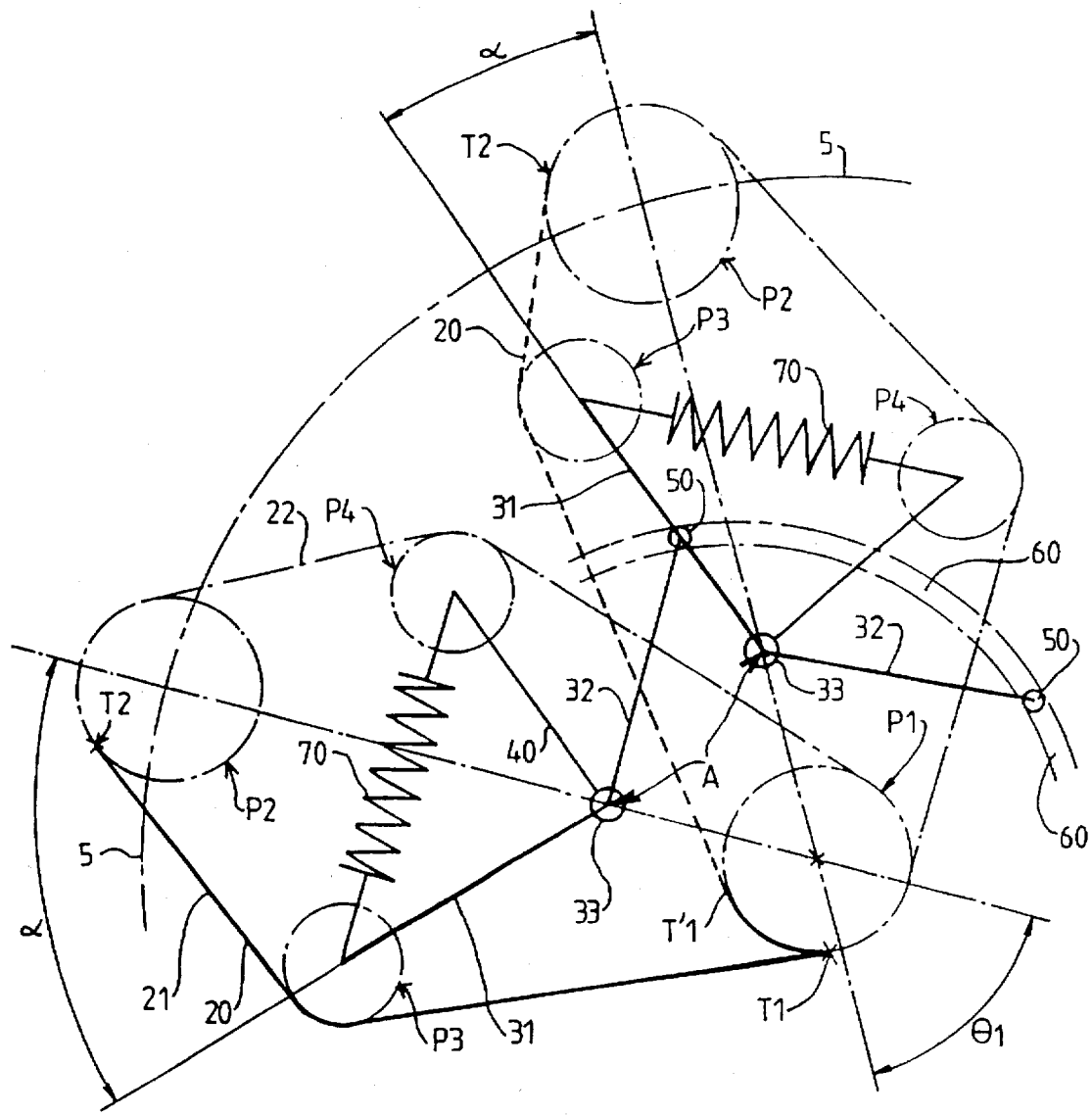

FIGS. 3a, 3b and 4 show a controlled tension device according to the invention. The controlled tension device includes two tension pinions P3 and P4, the pinion P3 being designed to tighten a strand 21 of the chain 20 between the pinions P1 and P2 and the pinion P4 being designed to tighten a strand 22 between the pinions P1 and P2. The pinion P3 rotates around a point A, this rotation being driven by a pin 50, guided by a cam 60.

To this end, a linking element 30 makes a rigid link between the pin 50 and pinion P3. The linking element 30 is connected to the controlled tension device at a point A. The linking element 30 may rotate freely about an axis passing through point A. A first arm 31 of the linking element 30 extends between joint A and pinion P3. A second arm 32 of the linking element 30 extends between point A and the pin 50.

A third arm 40 rotates about an axis passing through point A and includes the pinion P4 at one end. This connection between the third arm 40 and point A enables the pinion P4 to rotate independent of the first arm 31 and the second arm 32 such that a spring 70, shown in FIG. 4 enables the pinions P3 and P4 to be pulled apart from each other so as to obtain a more or less continual tension on the chain 20.

The controlled tension device, which includes the linking element 30, the arm 40 and pinions P3 and P4, is fastened on a linking element providing a rigid link between the pinions P1 and P2. As a result the controlled tension device can rotate freely around point A. It is notable that point A may be located outside the line linking the rotational axes of pinions P1 and P2.

Figure 7B:
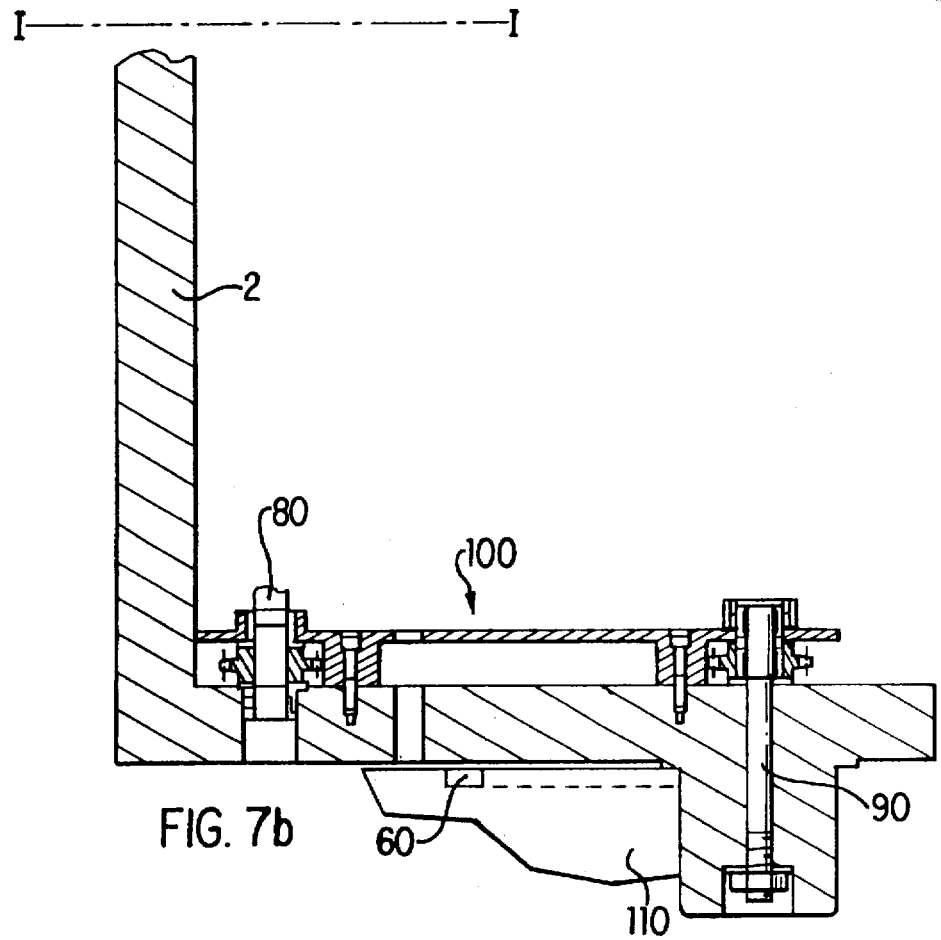
FIG. 7b illustrates a vertical section of the mantlet of FIG. 7a in which the controlled tension device has been removed.
Figure 7A:
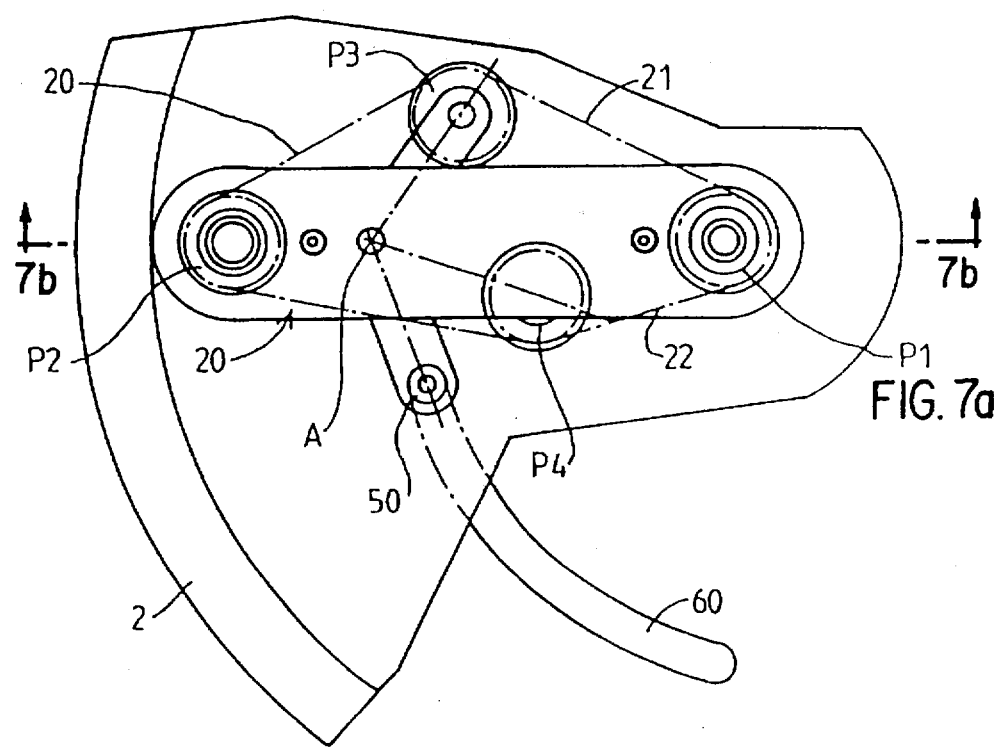
FIG. 7a illustrates a side view of the mantlet of a gun upon which a preferred embodiment of the present invention has been mounted.

The groove 60 which serves as an inner and outer cam in which the pin 50 moves is arranged on an immobile part 110 (see FIG. 7a) and does not rotate with the pinion P2. The position of the pin 50 defines the angle $\alpha$ (see FIG. 4) which exists between the tension device and the axle linking pinions P1 and P2 and, consequently, the position of pinion P3. The position of pinion P4 is the resultant of the position of pinion P3 and the total length of the chain.

The position of the pinion P3 influences the length of the strand 21 linking the pinions P1, P3, P2 between points T1 and T2 illustrated by a continuous line in FIG. 4 and, correspondingly, that of the strand 22 linking the P1, P4, P2. For a given position in elevation (shown by the dotted lines), the pinion P2 not rotating around its own axis, the variation of the length of the strand 21 linking pinions P1, P3, and P2 in this position between points T1 and T2 is translated by a rotation of the pinion P1 about its own axis inducing a counter-rotation $\theta_2$ of the pinion P1 which enables the afore-mentioned rotation $\theta_2$ to be cancelled.

Figure 5:
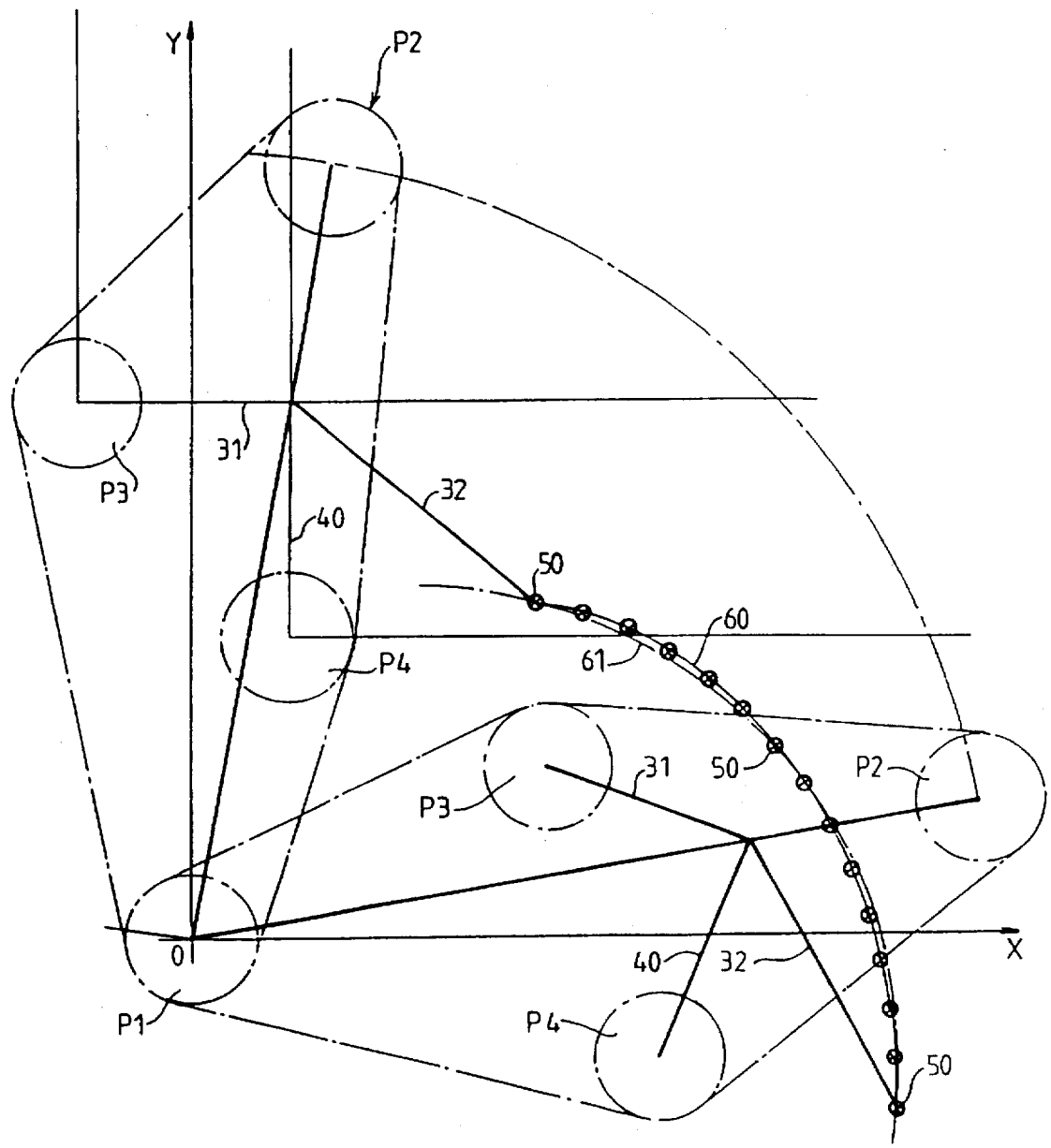
FIG. 5 illustrates the geometric construction of the profile of the cam element.
Figure 6A:
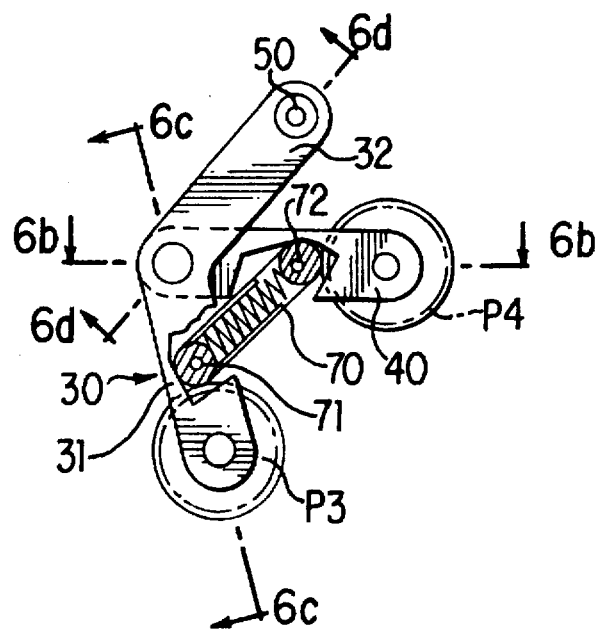
FIG. 6a illustrates the controlled tension device according to the invention and FIGS. 6b–6d illustrate partial cross-sections of the controlled tension device.
Figure 6B:
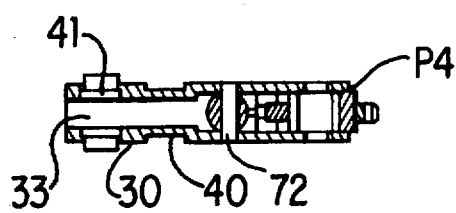
Figure 6C:
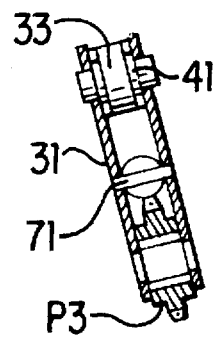
Figure 6D:
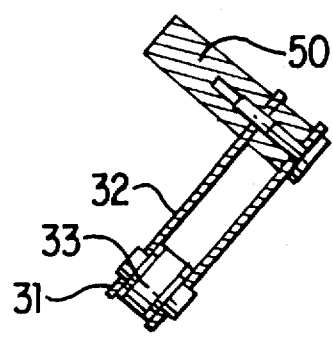

FIG. 5 shows an example of the construction of the profile of the cam 60. A certain number of points must be determined for which the compensation is obtained. The profile of the cam 60 is very close to that of an arc of a circle, which means that an approximate compensation may be obtained with a cam 60 forming the arc of the circle.

The controlled tension device according to the invention thus has two functions:

1) for a given position in elevation, it enables power transmission by movement of the chain 20, i.e., a rotation of pinion P2 around its own axis rotates in turn the pinion P1 around its axis, hence the driving the ammunition conveyor;

2) where there is no rotation of pinion P2 around its axis, i.e., no power transmission by the chain 20, it enables a movement in elevation of the gun without rotation $\theta_2$ of pinion P1 around its axis.

FIGS. 4 and 5 show the kinematics of the elevation positions in greater detail. When the pin 50 moves in the groove 60, a rotation $\theta_1$ of the pinion P2 around P1 drives a first rotation $\theta_2$ of the pinion P1 around its own axis. The rotation $\theta_1$ of pinion P2 around P1 also produces the movement of the pin 50 in the groove 60 which controls the angle $\alpha$ (see FIG. 4) between the controlled tension device and the axis linking the rotational axes of the pinions P1 and P2, hence the variation in length of the strand 21 linking pinions P1, P3 and P2 between points T1 and T2. The induced variation in the length of the strand 21 is translated by a second rotation $\theta_2$ in the opposite direction of pinion P1 around its own axis which results in the cancellation of the rotation of pinion P1. Thus, the rotation in elevation $\theta_1$ drives a rotation $\alpha$ of the controlled tension device.

The profile of the cam 60, due to the swivelling $\alpha$ of the tension device, makes it possible to keep the length of the chain 20 the same between points T1 and T2 whatever the position of pinion P2, the length of the strand 21 being reduced by the length of the arc of the circle T1T'1 (FIG. 4). This corresponds to the reciprocal cancellation of the two rotations $\theta_2$ and $\theta'_2$, hence a resultant rotation of pinion P1 around its own axis which is zero during the movement in elevation of the gun 1.

This device which operates totally mechanically and automatically by implementing the controlled tension device described hereabove, is both simple to carry out and reliable.

With reference hereafter to FIGS. 6a–6d, 7a and 7b the controlled tension device is mounted on a plate 100 attached to the mantlet 2, the reference numeral 80 designating the input shaft controlling the rotation of pinion P2, and the reference numeral 90 showing the pivotal axis of the pinion P1.

The spring 70 is mounted between two coupling points 71 and 72 located approximately half-way along the arms 31 and 40. The section 6b–6d of FIG. 6a also shows that the arm 40 which includes the pinion P4 is connected by a joint at point A of the linking element 30.

The invention is not restricted to the embodiments described and shown.

In particular, the movement of the pinion P4 may be produced by guiding it in translation, for example according to the axes of pinions P3 and P4, instead of the disclosed trunnion link around point A in which a spring urges the pinions P3 and P4 apart from each other, nevertheless making it possible to obtain the appropriate tension of the chain 20.

The movement of pinion P2 does not necessarily have to be part of a circle; it may also be a curve approaching part of a circle or any other curve in as much that it is always possible, by chosing a suitable profile for the cam 60, to achieve the at least partial compensation of the rotation of pinion P1.

It goes without saying in particular where there is no rotation of the pinion P1 that this may be replaced by any other type of imposed rotation to obtain a particular function which may or may not be connected to the other movements.

In practice, it is possible to determine the profile of the cam 60 by computation or empirically by marking off a certain number of characteristic positions of the pin 50 obtained by manually positioning the controlled tension device in positions which correspond to the angular compensation required.

What is claimed is:

1. A transmission device, comprising:
    a central wheel disposed to rotate about a central wheel axle, said central wheel axle being fixed in a first position;
    a satellite wheel having a satellite wheel axle, said satellite wheel and said satellite wheel axle being revolvable around said first position wherein said satellite wheel does not rotate about said satellite wheel axle;
    a drive element connecting said central wheel and said satellite wheel, said drive element having a first portion and a second portion, wherein revolving said satellite wheel in a first direction around said central wheel induces said central wheel to rotate in a second direction opposite said first direction; and
    a tension controller connected to said drive element that controls a tension of said drive element to at least partially compensate for rotation of said central wheel induced by said satellite wheel.

2. The transmission device of claim 1, wherein said tension controller is connected to said first portion of said drive element.

3. The transmission device of claim 1, wherein said tension controller includes a linking element disposed to rotate about a linking element axle, said linking element axle being fixed with respect to said driving element in a second position, said linking element having a first arm with a first tension wheel disposed to rotate about a first tension wheel axis and a second tension wheel connected to said first tension wheel and disposed to rotate about a second tension wheel axis, said first arm being connected to a pin engageable with a cam, wherein engagement of said pin with said cam moves said first arm and said first tension wheel in a first trajectory to change said tension of said drive element.

4. The transmission device of claim 3, wherein said drive element is one of a chain and a synchronous belt, and wherein said central wheel, said satellite wheel, said first tension wheel and said second tension wheel are pinions shaped to engage said drive element.

5. The transmission device of claim 3, wherein said linking element includes a spring that urges said first tension wheel away from said second tension wheel to stretch said first portion and said second portion of said drive element.

6. The transmission device of claim 3, wherein said first arm is connected to said pin by a second arm, and wherein said linking element includes a third arm, said third arm having a first end to which said second tension wheel axle is connected and a second end disposed to rotate independent of said first arm and said second arm about a third arm axle disposed coaxially with said linking element axle.

7. The transmission device of claim 3, wherein a profile of said cam includes a groove, and wherein said pin is shaped to slide within said groove.

8. The transmission device of claim 3, wherein a profile of said cam includes at least a portion of a circle.

9. The transmission device of claim 3, wherein said first trajectory includes at least a portion of a circle.

10. The transmission device of claim 3, wherein said central wheel axis, said satellite wheel axis and said first tension wheel axis are substantially parallel, and wherein said central wheel, said satellite wheel and said first tension wheel are substantially coplanar.

11. A laying mechanism for a weapon, comprising:
    a central wheel disposed to rotate about a central wheel axle and to drive movement of rounds for said weapon, said central wheel axle being fixed in a first position;
    a satellite wheel connected to an elevation shield mantlet having a satellite wheel axle, said satellite wheel and said satellite wheel axle being revolvable around said first position wherein said satellite wheel does not rotate about said satellite wheel axle;
    a drive element connecting said central wheel and said satellite wheel, said drive element having a first portion and a second portion, wherein rotating said satellite wheel in a first direction moves said drive element to induce said central wheel to rotate in a second direction opposite said first direction; and
    a tension controller connected to said drive element that controls a tension of said drive element to at least partially compensate for rotation of said central wheel induced by said satellite wheel.

12. The laying mechanism of claim 11, wherein said tension controller is connected to said first portion of said drive element.

13. The laying mechanism of claim 11, wherein said tension controller includes a linking element disposed to rotate about a linking element axle, said linking element axle being fixed with respect to said driving element in a second position, said linking element having a first arm with a first tension wheel disposed to rotate about a first tension wheel axis and a second tension wheel connected to said first tension wheel and disposed to rotate about a second tension wheel axis, said first tension wheel axis and said second tension wheel axis being substantially parallel to said central wheel axis, said first arm being connected to a pin engageable with a cam, wherein engagement of said pin with said cam moves said first arm and said first tension wheel in a first trajectory to change said tension, whereby possible laying positions of said weapon in elevation are represented by said first trajectory.

14. The laying mechanism of claim 13, wherein said drive element is one of a chain and a synchronous belt, and wherein said central wheel, said satellite wheel, said first tension wheel and said second tension wheel are pinions shaped to engage said drive element.

15. The laying mechanism of claim 13, wherein said linking element includes a spring that urges said first tension wheel away from said second tension wheel to stretch said first portion and said second portion of said drive element.

16. The laying mechanism of claim 13, wherein said first arm is connected to said pin by a second arm, and wherein said linking element includes a third arm, said third arm having a first end to which said second tension wheel axle is connected and a second end disposed to rotate independent of said first arm and said second arm about a third arm axle disposed coaxially with said linking element axle.

17. The laying mechanism of claim 13, wherein a profile of said cam includes a groove, and wherein said pin is shaped to slide within said groove.

18. The laying mechanism of claim 13, wherein a profile of said cam includes at least a portion of a circle.

19. The laying mechanism of claim 13, wherein said first trajectory includes at least a portion of a circle.

20. The laying mechanism of claim 13, wherein said central wheel axis, said satellite wheel axis and said first tension wheel axis are substantially parallel, and wherein said first trajectory includes at least a portion of a circle, wherein said central wheel, said satellite wheel and said first tension wheel are substantially coplanar.

* * * * *